United States Patent [19] [11] 4,391,588

Matsui [45] Jul. 5, 1983

[54] DENTAL TREATMENT CHAIR

[75] Inventor: Takahiro Matsui, Uji, Japan

[73] Assignee: Kabushiki Kaisha Morita Seisakusho, Kyoto, Japan

[21] Appl. No.: 316,824

[22] Filed: Oct. 30, 1981

[30] Foreign Application Priority Data

Nov. 7, 1980 [JP] Japan .......................... 55-160159[U]

[51] Int. Cl.[3] .......................... A61G 15/00; A61C 1/14

[52] U.S. Cl. .......................... 433/33; 433/78; 433/98

[58] Field of Search .......................... 433/33, 78, 98, 100; 297/191

[56] References Cited

U.S. PATENT DOCUMENTS

| | | | |
|---|---|---|---|
| 3,259,430 | 7/1966 | Beach | 433/33 |
| 3,262,735 | 7/1966 | Thompson | 433/78 |
| 3,568,318 | 3/1971 | Martin | 433/100 |
| 3,872,593 | 3/1975 | Thornton, Jr. et al. | 433/98 |
| 4,209,907 | 7/1980 | Tsukada et al. | 433/93 |
| 4,311,461 | 1/1982 | Hotta et al. | 297/191 |

FOREIGN PATENT DOCUMENTS

| | | | |
|---|---|---|---|
| 2399235 | 4/1979 | France | 433/98 |
| 1446033 | 8/1976 | United Kingdom | 433/98 |

*Primary Examiner*—John J. Wilson
*Attorney, Agent, or Firm*—Koda & Androlia

[57] ABSTRACT

The disclosure relates to a dental treatment chair which contains in its backrest a dispensing controller for compressed air and water to be distributed to the dental instruments of the chair; the controller includes a distributing block for air and water, air-pressure-operated on-off valves, and couplings to connect flexible connecting pipes connected to the instruments to the supply source side. The chair can reduce the number of compressed air and water pipes leading from the seat body to the backrest of the chair and can diminish the distance of piping between the dental instruments and the dispensing controller to reduce passage resistance.

1 Claim, 3 Drawing Figures

DENTAL TREATMENT CHAIR

BACKGROUND OF THE INVENTION

1. Field of the Invention

This invention relates to a dental treatment chair and more particularly to a dental treatment chair in which a backrest having therein reeling means for flexible pipes connected to instruments is reclinably titlably mounted on a seat body, and a dispensing controller for controlling compressed air and water to the instruments, a distributing block, and couplings for flexible pipes to each of the instruments are provided in the seat body.

2. Prior Art

The conventional dental treatment chairs are so designed as to control the compressed air and water to be supplied to instruments by a solenoid valve operated by controller, but the controller, which uses numerous large sized solenoid valves, makes it difficult to reduce the overall size of the device. Accordingly, it is almost impossible to install the device in such a small space as the inside of a backrest, with the result that the controller has to be mounted in a seat body which has larger inside space.

However, in the dental treatment chairs having such a controller incorporated into the seat body, the connecting pipes connected to five to six instruments detachably mounted on the shoulder of the backrest had to be introduced into the seat body and connected to the control device. Consequently, repeated reclining movements of the backrest not only caused bending or breaking and shortened the life of each flexible pipe on that "bridge"area of the flexible pipe spanning from the backrest to the seat body, but also had an adverse effect on the supply of compressed air and water. This was a problem. In this manner, in addition to the fact that introduction of the connecting pipes into the seat body proportionately required longer piping and increased passage resistance, it often happened that even if the controller functioned properly, the instruments at the ends of the connecting pipes failed to provide desired efficiency. Besides, the conventional chairs of the kind described made it necessary to check and repair both the backrest containing connecting pipe reeling means therein and the seat body containing the controller therein, thus requiring much trouble. Furthermore, when it came to transporting the chair of the type described, such complicated connection of numerous connecting pipes to the controller inside the seat body made reconnection of the pipes and reassembling of the chair difficult when the chair was transported with the backrest and seat body separated from each other. Accordingly, the chair had to be transported in an assembled form, which resulted in large bulk at an increased transportation charge. The facts described above were some of the accompanying problems of the conventional chairs.

SUMMARY OF THE INVENTION

This invention is directed to an overall solution of the problems described above by constituting a novel dispensing controller by using, instead of solenoid valves, small air-pressure-operated valves requiring no electric wiring, a distributing block for compressed air and water, and flexible connecting pipe couplings so as to make it possible to miniaturize and simplify the controller in a greater degree than the conventional controller, to hereby assemble the controller into a bracket of the chair.

BRIEF DESCRIPTION OF THE DRAWINGS

A description will now be given of an embodiment of the invention with reference to the accompanying drawings, and in which.

DETAILED DESCRIPTION OF THE INVENTION

Figure 1:
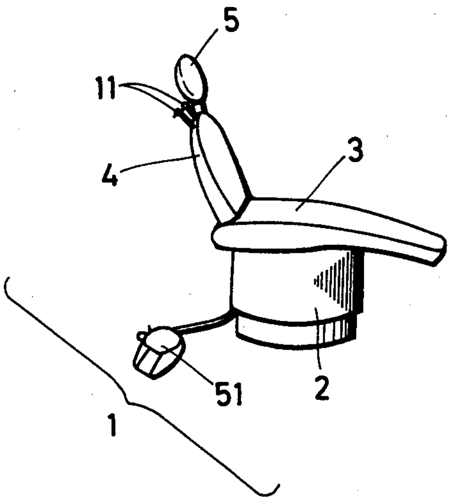
FIG. 1 is a perspective view of an embodiment of the dental treatment chair according to the present invention.

In FIG. 1 the numeral 1 designates a dental treatment chair. The chair 1 comprises a base 2, a seat body 3, a backrest 4, a headrest 5, and a foot controller 51. The chair 1 is constructed in such a manner that the seat body 3 is elevatable with respect to the base 2, the backrest 4 is reclinable with respect to the seat body 3, and the headrest 5 is reclinable with respect to the backrest 4.

Figure 2:
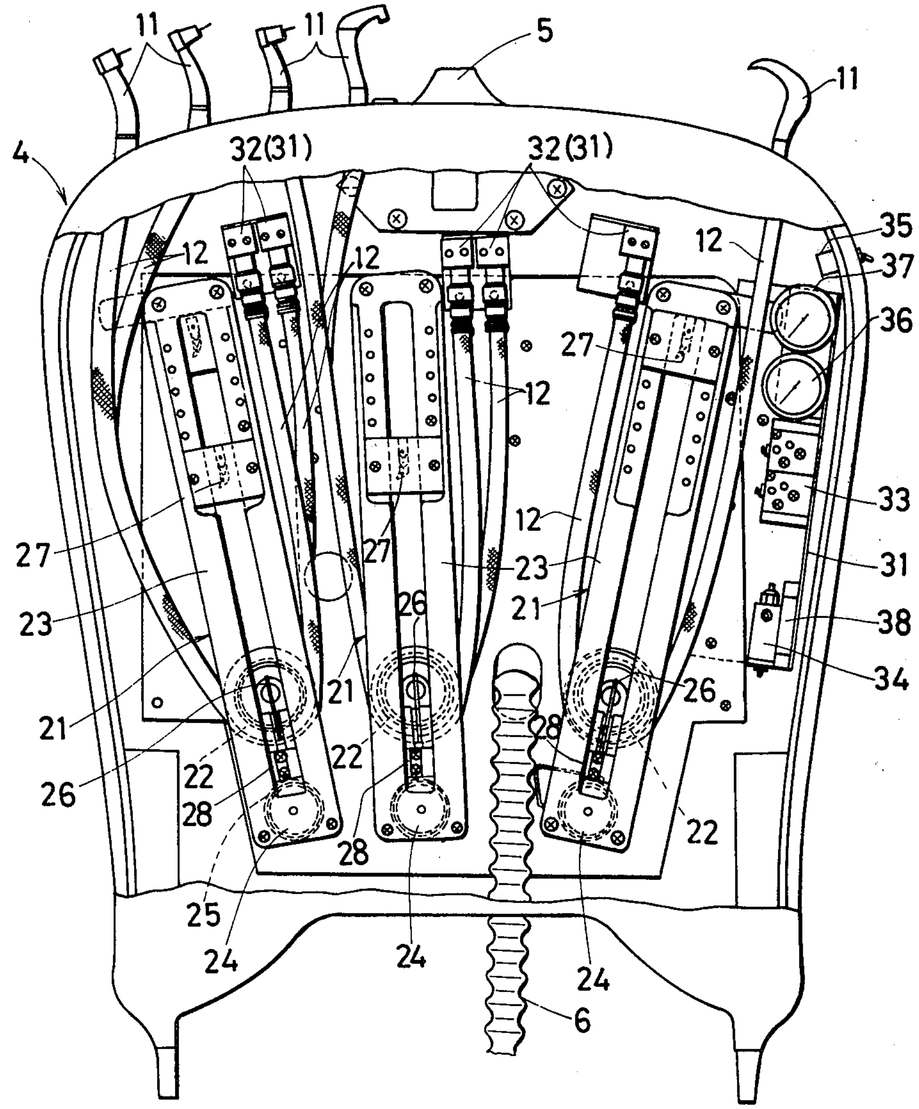
FIG. 2 is a front view, broken in part, showing the interior of a backrest of the chair.

On the shoulder of the backrest 4 are arranged various instruments 11, such as a dental handpiece, syringe, so as to permit the free drawing of a desired instrument from the shoulder area. As shown in FIG. 2, reeling means 21 . . . for flexible connecting pipes 12 . . . connected respectively to the instruments 11 . . . are arranged and fixed in several pairs (three pairs are shown) inside the backrest 4. The reeling means 21 . . . are laid one over the other by two's and are arranged spacedly away from and substantially parallel to each other pair. Dispensing controllers 31 (though couplings 32 . . . constituting the controller are shown spaced away) for controlling compressed air and water to be supplied to each instrument 11 are arranged compactly inside the backrest 4 along the frame on the lateral side of the backrest 4.

The reeling means 21 is known per se, and it is constructed in such a manner that a slide 28 having a fishing-hook shaped catch spring 26 and a driving pulley 22 is supported slidably on a guide 23, a fixed pulley 24 is mounted on the base end of the guide 23 and a catch 27 is mounted on the top end of the guide 23, a spiral spring 25 free at its inner diameter end is wound on the fixed pulley 24 and is connected at its outer diameter end to the slide 28 and in the manner that a flexible connecting pipe 12 connected to the instrument 11 is rolled up on the driving pulley 22 in substantially a U-shaped form and is fixedly connected at its base end to the coupling 32. The reeling means 21 are designed to operate in such a manner that, when the instrument 11 is drawn to pay out the connecting pipe 12 until the catch spring 26 of the slide 28 is engaged with the catch 27 at the end of the guide 23, the slide 28 slides toward the end of the guide 23 against the tension of the spring 25, whereby the flexible pipe 12 may be paid out to the length twice as long as the slide distance of the pipe 12. Conversely, the pipe 12 may be smoothly drawn back by slightly paying out the pipe once more to bring the catch 27 out of engagement with the catch spring 26 and reducing the paying-out force of the pipe 12 to slide the slide 28 back to its original position by the pulling force of the spring 25.

On the other hand, the dispensing controller 31, as is shown in FIG. 2, is a compact assembly comprising distributing valves 33, an air-pressure-operated on-off valve 34 for opening and closing a water passageway by air pressure, a changeover valve 35 for an air passageway, manometers 36 and 37, a distributing block 38 for distributing compressed air and water to be supplied from the seat body 3 side, couplings 32 . . . for connecting the respective base ends of the flexible connecting pipes 12 . . . to the supply source side, an air passageway, a water passageway (both passageways are not shown), etc. The positions of the above mentioned members with respect to the passageways may be shown embodied in a circuit diagram in FIG. 3.

Figure 3:
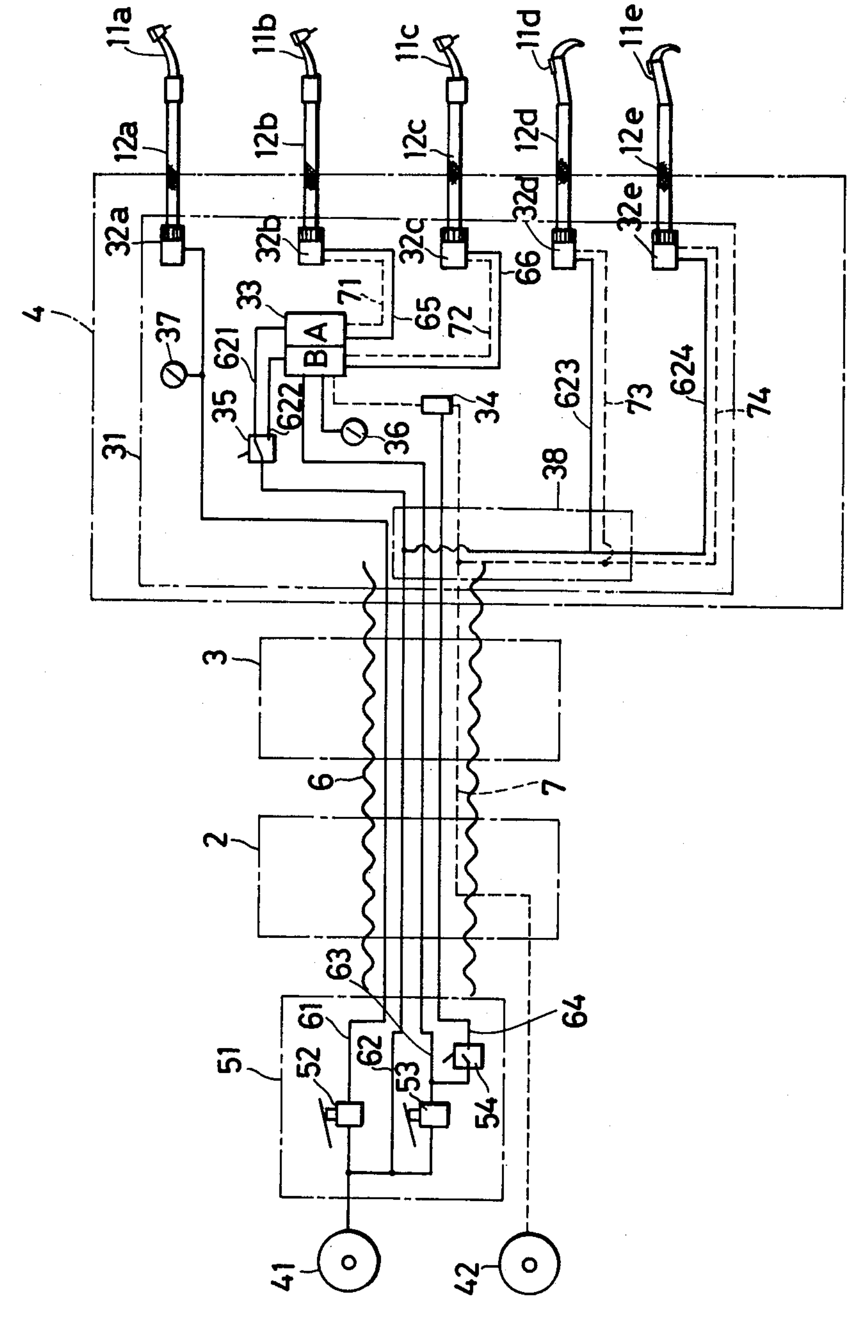
FIG. 3 is a circuit diagram showing an example of control.

Namely, FIG. 3 shows an entire control circuit diagram from a compressed air source 41 and a water source 42 to each instrument 11, wherein the aforementioned controller provided in the backrest 4 is shown by the portion defined by two-dotted chain line frame designated by the numeral 31. In FIG. 3 one-dotted chain line frames designated by the numerals 51, 2, 3, and 4 show a foot-controller 51, a base 2, a seat body 3, and a backrest 4 in order of designation, respectively. The air passageway from the compressed air source 41 is branched into three air passageways 61, 62 and 63 inside the foot-controller 51. The passageways 61 and 63 are provided with pressure-regulating on-off valves 52 and 53 which are designed to regulate the air pressure by working the pedal of the foot-controller 51. Another air passageway 64 is branched off from downstream of the on-off valve 53 of the passageway 63, and the passageway 64 is also provided with an on-off valve 54. The mentioned four air passageways 61, 62, 63 and 64, and a water passageway 7 from a water source 52, are bundled together and enclosed in one flexible pipe 6, and the pipe 6 is extended through the base 2 and seat body 3 into the backrest 4. The passageway 61 is connected through the manometer 37 of the controller 31 to a coupling **32*a* of the base portion of a flexible connecting pipe 12*a* connected to a relatively low-speed rotary air turbine handpiece 11*a* out of five instruments 11 . . . . The air passageway 62 branches off through a change-over valve 35 inside the controller 31 into an air passageway 621 leading to one valve chamber A of an air-pressure-operated distributing valve 33 and into an air passageway 622 leading to the other valve chamber B. The air passageway 63 is connected to the distributing valve 33, and the air passageway 64 is connected to an air-pressure-operated on-off valve 34 disposed in a water passageway 7 connected to the distributing valve 33. The valve chambers A and B of the distributing valve 33 and couplings 32*b* and 32*c* of the connecting pipes 12*b* and 12*c* of high-speed air turbine handpieces 11*b* and 11*c* are connected respectively by air passageway 65 and water passageway 71 and air passageway 66 and water passageway 72. The distributing valve 33 is provided with the manometer 36. The couplings 32*d* and 32*e* of the connecting pipes 12*d* and 12*e* of the remaining two syringes 11*d* and 11*e* out of the instruments 11 . . . contain therein throttle valves for compressed air and water, respectively. An air passageway 623 and a water passageway 73, and an air passageway 624 and a water passageway 74 are connected to the couplings 32*d* and 32*e* respectively; the air passageway 623 and 624 are branched in a distributing block 38 from upstream of the changeover valve 35 for the air passageway 62, while the water passageways 73 and 74 are branched from upstream of the air-pressure-operated valve 34 for the water passageway 7**.

A description will now be given of operation of the control circuit. When a valve 52 is turned on by working the pedal of the foot-controller 51, compressed air is supplied through a passageway 61 to an air turbine handpiece **11*a*, thereby rotating the turbine for the handpiece 11*a*. When the working of the pedal is stopped, the supply of air is suspended and the turbine stops. As previously described, pressure regulation of the compressed air is carried out by adjusting working amount of the pedal. Driving of high-speed rotary handpiece 11*b* and 11*c* can be carried out by the operation of the changeover valve 35 and by the working of another pedal of the foot-controller 51. Namely, when the valve 53 is turned on by working the pedal with the change-over valve 35 brought into the state shown, compressed air is supplied to the distributing valve 33 through the passageway 63. However, the compressed air of the same pressure is already being supplied to the valve chamber A of the distributing valve 33 through the passageways 62 and 621; therefore the valve remains closed, and because the other valve chamber B is brought into an ON state, the compressed air is supplied to a handpiece 11*c* through the passageway 66 to thereby drive the turbine of the handpiece 11*c*. In this case, the air-pressure-operated on-off valve 34 for the water passageway 7 is not supplied with compressed air through the passageway 64, and the valve 34 is in OFF state. Accordingly, the handpiece 11*c* is not supplied either with water through a water passageway 72. However, when an on-off valve 54 for the air passageway 64 is opened, compressed air is supplied to the air-pressure-operated on-valve 34, and the valve 34 is opened to supply water. On the other hand, when the changeover valve 35 is changed over opposite to the position shown, the valve chamber A of the distributing valve 33 is opened and the valve chamber B is closed, so that compressed air is supplied to a handpiece 11*b* and the handpiece 11*b* is driven. In this case also, supply and suspension of water are carried out by the on-off valve 54 of the foot-controller 51 in the same manner. Also, the couplings 32*d* and 32*e* of syringes 11*d* and 11*e* are always supplied with compressed air and water; accordingly, when the syringes 11*d* and 11*e* are used, it is only necessary to open the valves incorporated in the syringes 11*d* and 11*e***.

The description so far has been given of one preferred embodiment of dispensing control when the dental treatment chair is provided with one low-speed air turbine handpiece **11*a*, two high-speed air turbine handpieces 11*b*, 11*c*, and two syringes 11*d*, 11*e* as instruments 11 . . . . It will readily be understood by those skilled in the art that various compact and simple controllers comprising circuits using the air-pressure-operated valves described as above in accordance with the kind and number of instruments 11 . . . can be constructed. For example, when the controller comprises one high-speed handpiece, it becomes unnecessary to provide the distributing valve 33 and changeover valve 35. Depending upon circumstances, the manometers 36, 37 and the valve 35 may be dispensed with, and couplings containing no throttle valves therein may be used as the couplings 32. In this invention, the important elements are the distributing block 38, the air-pressure-operated on-off valve 34, and the couplings 32 (presence of throttle valves in the couplings is not essential). Namely, in the embodiment illustrated, the distributing block 38 makes it possible to dispense with addition of new air and water passageways to the instruments 11_d_ and 11_e_ by dividing one compressed air passageway 62 into two air passageways 623 and 624 and dividing one water passageway 7 into two passageways 73 and 74, the air-pressure-operated on-off valve 33 by itself serves a double purpose of effecting supply and suspension of air and water to the instruments 11_b_, 11_c_ and the air-pressure-operated on-off valve 34, in combination with the valve 33, effects distribution and suspension of water from one water passageway 7 to the instruments 11_b_, 11_c_. The couplings 32_a_, 32_b_, 32_c_, 32_d_ and 32_e_ make it possible in a very easy and compact manner to connect the passageways 61, 62, 63, 64, and 7 introduced by one flexible pipe 6 into the backrest 4 to the respective base end of the flexible connecting pipes 12 . . . by the couplings being disposed in proximity to the pipe reeling means 21 . . . . Accordingly, the distributing block 38, air-pressure-operated valves 33, 34 and couplings 32_a_–32_e_ constitute, in combination, an essential factor in enabling transfer of the dispensing controller 31 from the seat body 3 side to the inside of the backrest 4**.

As described above, since the treatment chair of the invention makes it possible to construct the dispensing controller 31 in a compact form by use of distributing block, air-pressure-operated valve and flexible pipe couplings and to incorporate the controller 31 into the backrest 4, it is not necessary to introduce, opposing to the conventional case, the flexible pipes 12 . . . connected to the instruments 11 . . . far into the solenoid valve-operated controller inside the seat body 3, thus eliminating such disadvantage that the flexible pipes 12 . . . were bent and damaged in a short time by repeated reclining of the backrest 4. Moreover, disposition of the dispensing controller 31 in the backrest may reduce the length of air and water passageways from the controller 31 to the instruments 11 . . . , with the result that passage resistance is reduced. This substantially prevents reduction in performance, along with the freedom of bending of the flexible pipes 12 . . . which form passageways, and make it possible for such operational efficiency as controlled by the dispensing controller 31 to be obtained from the instruments 11 . . . . Also, selder pipes, which constitute air passageways 61, 62, 63 and 64 and water passageway 7, respectively leading from the compressed air source 41 and water source 42 to the controller 31, are bundled and enclosed in one flexible pipe 6 so as to be introduced into the backrest 4; accordingly the number of pipes extending between the seat body 3 and the backrest 4 can be reduced substantially. Consequently, if the flexible pipe 6 is so constructed as to permit the connection and disconnection of the pipe 6 by means of a suitable coupling in the position adjacent to the point where the pipe 6 is led into the backrest 4, even those unfamiliar with the art can easily handle connecting work of passageway. In consequence, the backrest 4 can be detached from the seat body 3 to be transported separately. Reduction in size can save transportation changes proportionately.

Furthermore, inclusion of the dispensing controller 31 together with the flexible pipe reeling means 21 . . . in the backrest 4 conveniently provides easy access to repair and check-up of both devices 31 and 21 by assembling the backrest alone. In addition, the inclusion of the controller 31 in the backrest 4 makes it possible to effectively use for inclusion of other devices the space provided by the removal of the controller 31 from the conventional seat body 3. This is another advantage.

As described above, the dental treatment chair of the invention is very useful in that it can eradicate the inherent disadvantages of the conventional treatment chairs.

I claim:

1. A dental treatment chair having a backrest reclinably mounted on the seat body supported on a base, said backrest incorporating therein reeling means for flexible connecting pipes connected to the instruments of said chair, said chair characterized in that:

said backrest contains therein a dispensing controller for compressed air and water to be supplied to each of said instruments, said dispensing controller comprising:

a distributing block for said compressed air and water;

a manometer coupled to said compressed air; and air-pressure-operated valves for turning ON and OFF the compressed air and water, said air-pressure-operated valve being disposed between said distributing block for compressed air and water and said flexible pipes for said instruments;

at least one of said air-pressure-operated valves is a distributing valve for said compressed air and water;

a plurality of couplings disposed in proximity to said reeling means for connecting a base end portion of said flexible pipes to a compressed air and water supply side of said dispensing controller;

a throttle valve for controlling a flow rate of said compressed air and water provided in at least one of said couplings; and a plurality of air passageways branched off and connected and one water passageway connected to the respective supply sources of compressed air and water are bundled by one flexible pipe and introduced from said seat body side into said backrest.

* * * * *